United States Patent [19]

Touval

[11] 3,892,667

[45] July 1, 1975

[54] NOVEL FLAME RETARDANT COMPOSITIONS

[75] Inventor: Irving Touval, Edison, N.J.

[73] Assignee: M & T Chemicals Inc., Greenwich, Conn.

[22] Filed: Oct. 15, 1973

[21] Appl. No.: 406,194

Related U.S. Application Data

[63] Continuation-in-part of Ser. No. 869,366, Oct. 24, 1969, abandoned.

[52] U.S. Cl. ............. 252/8.1; 106/15 FP; 260/41 B
[51] Int. Cl.$^2$ ........................................ C09K 3/28
[58] Field of Search .................. 252/8.1; 106/15 FP; 260/41 B

[56] References Cited
UNITED STATES PATENTS

| | | | |
|---|---|---|---|
| 3,705,209 | 12/1972 | Matlack et al. | 252/8.1 X |
| 3,715,310 | 2/1973 | Butcher | 252/8.1 |
| 3,723,139 | 3/1973 | Larkin et al. | 252/8.1 X |
| 3,752,837 | 8/1973 | Okuto et al. | 252/8.1 X |
| 3,770,557 | 11/1973 | Humphrey | 106/15 FP X |
| 3,783,016 | 1/1974 | Randall et al. | 252/8.1 X |

*Primary Examiner*—Benjamin R. Padgett
*Assistant Examiner*—P. A. Nelson
*Attorney, Agent, or Firm*—Robert P. Auber; Kenneth G. Wheeless; Robert Spector

[57] ABSTRACT

Sodium antimonate particles wherein 40% or more of the particles are less than 1 micron in diameter and the range of particle diameters is between 0.1 to 8 microns impart an enhanced degree of flame retardancy to synthetic organic polymer compositions containing a halogen source. The flame retardancy is further improved if any alkaline impurities are removed by treating the particles with acidic reagents as required until the aqueous phase of a slurry prepared using distilled water and containing 10% by weight of the particles exhibits a pH of between 6.8 and 7.

3 Claims, No Drawings

NOVEL FLAME RETARDANT COMPOSITIONS

This application is a continuation-in-part of application Ser. No. 869,366, filed on Oct. 24, 1969, now abandoned.

BACKGROUND OF THE INVENTION

The invention defined herein relates to an improved antimony-containing synergist for halogen type flame retardants. This invention further relates to a method for preparing a form of sodium antimonate which, in the presence of a halogen source, imparts an enhanced degree of flame retardancy to synthetic organic polymer compositions.

The standards for polymeric materials to qualify as non-flammable have become more stringent with the increasing use of these materials in construction and wearing apparel.

It is well known that halogen-containing organic materials impart effective levels of flame retardancy to many synthetic organic polymers, particularly when the halogen is bromine or chlorine. Antimony compounds, such as antimony trioxide, appear to act as synergists with halogen-containing compounds at flame termperatures, in that they significantly enhance the degree of flame retardancy imparted by a given concentration of halogenated compound, even though the antimony compound when used alone is virtually ineffective in this regard. The antimony compounds are conventionally employed at concentrations of between 1 and 20%, based on the weight of the polymer composition. While the presence of these compounds is highly desirable from the viewpoint of increased flame retardancy they can adversely affect other physical properties of the polymer, such as clarity and strength, particularly at the higher use levels required to meet present standards. While antimony trioxide has been accepted as a standard in the industry, attempts have been made to find other compounds which are more efficient than antimony trioxide, and can therefore be employed at lower use levels without sacrificing flame retardancy.

One objective of this invention is to provide a flame retardant which is more efficient than antimony and can therefore achieve an equivalent level of flame retardancy using less antimony in the composition.

A second objective is to improve the flame retardancy imparted by a commercially available antimony compound.

SUMMARY OF THE INVENTION

This invention provides improved flame-retarding compositions consisting essentially of sodium antimonate and an organic chlorine- or bromine-containing compound equivalent to between 50 and 400% of chlorine or bromine based on the weight of the sodium antimonate, wherein the improvement resides in the presence of said sodium antimonate as particles, substantially all of which exhibit diameters of between 0.1 and 8 microns, at least 40% of the particles being smaller than 1 micron.

Preferably a 10% by weight aqueous dispersion of the sodium antimonate particles exhibits a pH of between 6.8 and 7.0.

This invention also provides flame retardant organic polymer compositions which comprise the aforementioned sodium antimonate particles, a normally flammable polymer and a halogen source, which may be the normally flammable polymer.

DETAILED DESCRIPTION OF THE INVENTION

A. The Sodium Antimonate Particles

Sodium antimonate is the sodium salt of stibinic acid and exists in a hydrated form that exhibits the emperical formula $Na_2Sb_2O_6 \cdot 0.5H_2O$. A commercially available form of this material has a particle size range of between 2 and 45 microns wherein 50% of the particles are larger than 11 microns and 12% are smaller than 1 micron. Data contained in the examples which form part of this specification demonstrate that the degree of flame retardancy imparted by this material to halogen-containing polymer compositions is considerably less than the flame retardancy achieved using an equal weight of antimony trioxide. It is also demonstrated that the flame retardancy imparted by antimony trioxide is independent of particle size (to within experimental error) up to an average particle size of 2.5 microns. It is therefore considered surprising and unexpected that the flame retardancy obtained using sodium antimonate as the synergist in combination with a halogen source can be significantly increased by reducing the particle size of this material to between 0.1 and 8 microns, such that 50% or more of the particles are less than 1.5 microns in diameter and 40% or more are less than 1 micron in diameter. Sodium antimonate exhibiting the desired particle size range is conveniently prepared from commercially available material such as Thermogard FR, available from M and T Chemicals Inc. using wet or drying milling techniques which are well known in the ceramic art. These include the use of ball mills, vibratory and fluid energy mills, and manually or mechanically operated mortar and pestle. Alternatively, the material can be passed between opposing faces of rapidly rotating abrasive disks.

A preferred embodiment of the present sodium antimonate particles contains at most insignificant amounts of water-soluble alkaline materials. The concentration of these alkaline materials is conveniently determined by measuring the pH value, a measure of the hydrogen ion concentration, of the water present in a 10% by weight dispersion of the sodium antimonate particles. The pH value of the water should be between 6.8 and 7 for optimum performance. The presence of alkaline materials has been shown to adversely affect the performance of sodium antimonate as a flame retardant. Commercial grades of sodium antimonate may contain significant amounts of alkaline materials which are introduced either as reactants or by-products during preparation of the compound. If these undesirable materials are present, they can conveniently be removed by washing the sodium antimonate with an amount of organic or inorganic acid sufficient to neutralize the alkaline materials. In some instances the amount of acid required may be relatively small based on the volume of antimonate particles, in which instance it may be convenient to employ an aqueous solution of mineral acid or lower carboxylic acid containing between 1 and 4 carbon atoms. Free or partially neutralized di- or polyfunctional acids such as ammonium oxalate or ammonium hydrogen phosphate can also be employed in addition to monofunctional acids. For ease in processing the acid should be a water miscible liquid or a water soluble solid.

The molar amount of acid employed to wash the sodium antimonate should not be significantly in excess of the stoichiometric amount required to neutralize the alkaline impurities, particularly if water is present. Sodium antimonate is quite soluble in acidic aqueous media, and a considerable amount may therefore be dissolved during the washing operation and be removed together with the supernatant water. Separation and evaporation of the water following the washing operation is a costly and time-consuming procedure which can easily be avoided by employing not more than the stoichiometric amount of acid. A convenient method for ensuring that the proper amount of acid is used involves preparing a mixture containing distilled water and 10%, based on the weight of water, of sodium antimonate particles. The mixture is agitated sufficiently to ensure that most if not all of the alkaline material entrapped within or on the surface of particle is dissolved. The pH of the supernatant liquid is measured, and if addition of acid is required, this is preferably done gradually while the pH of the aqueous phase is being monitored, and until the pH valve is within the preferred range of 6.8 – 7.0 as specified hereinbefore. If an excess of acid is inadvertently added, it can be neutralized using ammonium hydroxide or other suitable base to achieve the desired pH value.

B. The Organic Halogen Source

The sodium antimonate particles of this invention enhance the flame retardancy imparted to normally flammable polymeric materials by organic compounds containing bromine or chlorine. Suitable halogen-containing compounds include but are not limited to the following classes:

1. Chlorinated and brominated hydrocarbons such as methylene chloride, chloroform, the isomeric brominated and/or chlorinated ethanes, ethylenes, propanes, butanes and hexanes, halogenated cycloaliphatic hydrocarbons containing one or more rings which may be fused to form a bicyclic structure, halogenated aromatic hydrocarbons, including mono- and polyhalogenated benzene, toluene, xylene, naphthalene and anthracene. The compounds may contain one or more nonreactive substituents in addition to halogen, such as nitro or esterified acid or hydroxyl groups;

2. Chlorinated and brominated organic compounds containing one or more functional groups such as carboxylic acid anhydrides, amines, ketones and alcohols. Compounds containing two or more functional groups or a potentially reactive carbon-carbon double bond can be employed to prepare halogen-containing polymers which are useful as additives to render other polymers flame retardant in the presence of sodium antimonate. Alternatively the halogenated compounds can be incorporated by copolymerization into the polymer which is to be rendered flame retardant or non-burning;

3. Organic compounds containing halogen in addition to other elements, such as phosphorus, which impart flame retardancy to synthetic organic polymers. Preferred embodiments of this class of compounds are the brominated triakyl- or triaryl esters of phosphoric acid, including tris(2,3-dibromopropyl)phosphate and tris(2,4,6-tribromophenyl)phosphate.

The amount of halogen-containing organic compound required to impart a given degree of flame retardancy to a particular polymer may vary somewhat depending upon the inherent flammability of the polymer, the halogen content of the organic compound and whether the halogen is chlorine or bromine. These ranges are sufficiently disclosed in the literature that a comprehensive discussion in this specification is not required. Normally between 7 and 40% of chlorine or 3 to 20% of bromine, based on the weight of the polymer, provides acceptable levels of flame retardancy.

As disclosed hereinbefore, the organic polymer can also function as the halogen source if the halogen content is sufficiently high. Suitable halogen containing polymers include polyvinyl chloride, polyvinylidene chloride, and copolymers of vinyl chloride and/or vinylidene chloride with ethylenically unsaturated monomers, including ethylene, propylene and styrene. Polyesters and other condensation polymers wherein one or more of the precursors contain chlorine or bromine, i.e., tetrabromophthalic anhydride, are also useful as halogen sources.

As a general rule between 50 to 400% of bromine or chlorine, based on the weight of sodium antimonate, is suitable to achieve satisfactory to excellent performance in the presence of sodium antimonate. The concentration of sodium antimonate can be between 0.5 and 10%, based on the weight of the polymer. Concentrations of between 1 and 5% are preferred.

Flame retardant compositions containing the present sodium antimonate particles, a flammable synthetic organic polymer and a halogen source are prepared by blending the ingredients to form a homogeneous mixture which is then shaped to form the desired article. If the polymer melts without significant decomposition, the blending operation can be carried out using the molten polymer in the absence of any solvent or plasticizer. This is conveniently done using a heated roller mill such as a differential speed mill. Alternatively the blending and shaping operations can be combined by feeding the individual components into the heated barrel of an extruder.

The present flame retardant compositions can also be prepared at ambient temperature if the polymer is incorporated into a liquid composition such as a solution, emulsion, dispersion or plastisol. The particular solvent, emulsifier or plasticizer used to prepare the polymer composition will be dependent upon the polymer being flame retarded. Methods for preparing the various types of liquified polymer compositions are described in the chemical literature.

As disclosed hereinbefore, the sodium antimonate particles of this invention are applicable to practically all classes of halogen- and non-halogen-containing synthetic organic polymers. If the polymer does not contain sufficient halogen, one of the chlorinated or brominated organic compounds described in a preceding section of this specification must be present in the final composition to obtain the desired degree of flame retardancy. The present flame retarding agents can be combined with addition and condensation type polymers. Examples of the former class include homopolymers and copolymers derived from organic compounds containing one or more double bonds between adjacent carbon atoms. Representative compounds of this class include mono- and diolefins such as ethylene, propylene, butylene, butadiene, neoprene, isoprene, and the various halogen-containing derivatives thereof, such as chloroprene and tetrafluoroethylene; vinylic compounds, such as styrene, vinyl chloride, vinylidene chloride, vinyl esters such as vinyl acetate; unsaturated acids and derivatives thereof, such as maleic acid, acrylic acid, methacrylic acid and esters derived from reaction of these acids with alcohols containing between 1 and 12 carbon atoms, inclusive; and unsaturated compounds containing various substituents, exemplified by acrylonitrile and 2-vinylpyridine.

Condensation polymers are prepared from monomers containing 2 or more functional groups such as carboxylic acid, hydroxyl, amine or isocyanate which can react intramolecularly to form an ester, amide, carbonate, urethane or other radical which characterizes the repeating unit of the polymer.

Addition polymers are prepared by bringing the monomer or monomers into contact with a source of free radicals, such as a peroxide, peroxy acid or compound containing an azo radical, i.e., azo-bis-isobutyronitrile. The polymerization is relatively rapid and often exothermic.

Condensation polymerization reactions are usually considerably slower than addition type polymerizations. Elevated temperatures and the presence of acid or other type of catalyst are often required to achieve a useful reaction rate. Exceptions to this are the reaction of isocyanates with hydroxyl-containing compounds and the homopolymerization of epoxide radicals

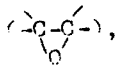, which can be considered addition type reactions since no by-products, such as water, are generated. This is also true for the reaction of phenols, melamines or ureas with formaldehyde. Examples of condensation type polymers include polyesters such as polyethylene terephthalate, polybutylene sebacate and unsaturated polyesters derived from phthalic anhydride, maleic anhydride and ethylene glycol or other difunctional alcohol; polyamides, including poly(hexamethylene adipamide), poly(hexamethylene terephthalamide) and polycaprolactam; the acetal resins and polysulfides.

Specific methods for preparing all of the foregoing classes of polymers are described in textbooks, journal articles and are usually available upon request from many manufacturers of the monomers. A complete discussion of polymer preparation in the present specification is therefore not required, since the procedures are known to those familiar with the art relating to synthetic organic polymers.

The following examples compare the flame retardancy imparted by the present form of sodium antimonate with the results obtained using (a) the commercially available material and (b) antimony trioxide of various particle size ranges. All parts are by weight unless otherwise specified.

EXAMPLE 1

Sodium antimonate particles within the size range specified hereinbefore were prepared either by (1) dry grinding for 6 hours using a 1 gallon capacity pebble mill containing 1 kg. of coarse sodium antimonate, and 1 inch (2.5 cm.)-diameter alumina pebbles, the mill being rotated at a speed of 54 revolutions per minute, or (2) wet grinding in a Sweco grinding mill containing 7 liters of water, 11.3 kg. of coarse sodium antimonate and 0.5 inch (1.25 cm.)-diameter aluminum cylinders, the mill being rotated for 25 hours at full speed. The resultant slurry was dried in an oven and the agglomerates were broken up using a pulverizing mill.

The flame retardant synergists were evaluated using an 0.018 inch-thick polyvinyl chloride film. The formulation employed to prepare the film contained 100 parts of a vinyl chloride homopolymer (Diamond 450 PVC), 41 parts of dioctyl phthalate 10 parts epoxidized soybean oil, 2.5 parts of a commercial barium-cadmium-zinc type stabilizer and 0.5 part stearic acid. This mixture was blended at a temperature of between 104° and 116°C., then discharged from the mixer and allowed to cool. A mixture containing 150 parts of this formulation and the type of sodium antimonate set forth in the following table was blended on a two-roll mill wherein the space between the rolls was 0.018 inch and the rolls were heated to a temperature of 163°C. The mixture formed a sheet around one or the rolls, and was removed five minutes following the start of the milling operation. The sheet was allowed to cool, following which it was cut into strips measuring 9 by 3 inches (23 by 8 cm.). The flame retardancy of the strips was measured using the procedure specified in ASTM test 1433-58, which can be summarized as follows:

The flame emanating from the point of a number 22 hypodermic needle supplied with butane gas is placed within ½ inch of a narrow (3 inch) end of the test specimen. The specimen is secured in a holder, which, together with thee flame source is placed in a cabinet so as to minimize interfering air currents. A string is extended across the front of the specimen and a second string is extended across the rear of the specimen, the distance between the two strings being approximately 6 inches. A flame is then applied to the specimen. Any specimen wherein the flame continues to burn through the lower string but is extinguished before reaching the upper string is designated as "self-extinguishing." If the flame is extinguished before reaching the lower string, which is 2 inches from the point at which the sample is ignited, the sample is designated "non-burning."

The antimony compounds evaluated were (1) sodium antimonate exhibiting a particle size as specified herein (0.1–8 microns, at least 40% of the particles being smaller than 1 micron), (2) a commercially available grade of sodium antimonate (particle size =2–45 microns, 50% larger than 10 microns, 12% smaller than 1 micron).

The type and amount of sodium antimonate present in each of the samples and the average flame spread, i.e., the length of sample burned, are summarized in the following table. The average flame spread is determined using five samples.

| Particle Size Range (microns) | Amount (parts) | Average Flame spread(inches) |
|---|---|---|
| 0.1–8 | 1 | 1.87 |
| '' | 2 | 0.85 |
| '' | 3 | 0 |
| '' | 4 | 0 |
| '' | 5 | 0 |
| 2–45 (control) | 1 | 5.0 |
| '' | 2 | 1.9 |
| '' | 3 | 0.9 |
| '' | 4 | 0.67 |
| '' | 5 | 0 |

These data demonstrate the relationship between particle size and flame retardancy which is characteristic of sodium antimonate.

EXAMPLE 2

This example demonstrates that the inverse relationship between particle size and flame retardancy observed using sodium antimonate in combination with a halogen source does not hold when the antimonate is replaced by antimony trioxide. The test specimens were prepared as described in Example 1 using 2 parts of antimony trioxide per 100 parts of film. The average particle size of the three samples of antimony trioxide evaluated were 2.5, 1.5 and 0.9 microns, i.e., 50% of the particles were larger or smaller than these values.

| Film Thickness(mils) | Average Particle Size (microns) | Flame Spread (inches) |
| --- | --- | --- |
| 18 | 2.5 | 1.8 |
| 24 | 1.5 | 1.5 |
| 20 | 0.9 | 1.6 |

All of the flame spread values are equivalent within experimental error, which indicates that the flame retardncy imparted by antimony trioxide in combination with a halogen source is virtually independent of the particle size of the oxide. The data set forth in Example 1 is even more surprising in view of this finding. It should be noted that the flame spread for a sample containing 2 parts of antimony trioxide is equivalent to the flame spread attained using only 1 part of the sodium antimonate particles which are within the scope of the present invvention, yet the sodium antimonate contains 30% less antimony than the trioxide (59.2% for the antimonate vs. 83 for the trioxide). This is contrary to the teachings of the prior art, which requires a higher content of antimony for increased flame retardncy.

EXAMPLE 3

This example demonstrates the improved flame retardncy imparted to polyethylene by the preferred sodium antimonate particles of the present invention, which have been freed from alkaline impurities by treating an aqueous dispersion of the particles with either chlorendic or phosphoric acid until the aqueous phase of the dispersion exhibits a pH of 6.8–7.0.

Following the treatment with acid the dispersed particles were isolated and dried prior to being incorporated into the polyethylene formulation. The polyethylene formulation contained 100 parts (based on the final composition) polyethylene, 8 parts Chlorowax 70S (a chlorinated paraffin containing 70% chlorine and manufactured by Diamond Alkali Company), 8 parts of one of the sodium antimonate compostions noted in the accompanying Table, and 0.7 parts pentaerythritol stabilizer. The various polyethylene formulations were milled, pressed and cut into ⅛ inch × ⅛ inch × 6 inch strips.

The strips were burned using the G.E. Flammability Tester. This tester is reported and described in the November 1966 issue of *Modern Plastics* at pages 141–148 and 192. The test involves placing samples in a vertically oriented Pyrex tube of approximately 3.5 inches in diameter which has a bed of glass beads disposed in the bottom thereof and a smaller Pyrex tube of approximately 7 mm. in diameter located concentrically with respect to the larger tube. The specimens are suspended above the smaller tube and pure oxygen, nitrogen, or a known mixture of the two gasses is introduced in the bottom of the larger tube and flows up through the glass beads. The flow of the gas is controlled through specially prepared and monitored orifices. Once the desired atmosphere is established within the tester, a flame is touched to the resin sample and depending upon their burning characteristics in such an environment an oxygen index is determined for the particular sample being burned according to the formula $$\text{Oxygen Index} = n = \frac{[O_2]}{[O_2] + [N_2]}$$

Specimens with an oxygen index of 0.21 or less burn very rapidly in air while an oxygen index of more than 0.21 indicates that the specimen would burn sluggishly if at all in air.

As noted in the test procedure, a standard polyethylene composition has an oxygen index of about 0.174 plus or minus 0.001. From the following table, it can be seen that the alkali-free sodium antimonate prepared in accordance with the present teaching imparts a degree of flame retardancy to the polyethylene formulation superior to that obtained using particles of the present size range which have not been treated with acid, regardless of whether the neutralizing agent is chlorendic acid or phosphoric acid.

| | Particle Size | Oxygen Index[1] |
| --- | --- | --- |
| Sodium Antimonate (not acid washed) | .1 – 8 microns | .233 |
| Sodium Antimonate from dispersion neutralized with chlorendic acid | .1 – 8 microns | .243 |
| Sodium Antimonate from dispersion neutralized with phosphoric acid | .1 – 8 microns | .239 |
| 1-Average of 10 Specimens | | |

EXAMPLE 4

As further evidence of the beneficial properties obtained with the present alkali-free sodium antimonate particles, the yellowness indices of polyethylene samples were compared using the polyethylene formulation described above. The specimens were tested as described in ASTM Test No. D1925-63T, which rates the degree of yellowness exhibited by samples after being heated in an oven at 350°F. (176°C.).

From the following table it can be seen that removal of the alkaline impurities as described hereinbefore yields a substantial reduction in the yellowness index of heat treated polyethylene compared to the samples containing sodium antimonate particles of the proper size range which had not been washed with acid.

| Sample | Yellowness Index[1] |
| --- | --- |
| Control-containing no sodium antimonate | 10.11 |
| Sodium Antimonate (untreated) | 33.04 |
| Sodium Antimonate (acid washed) | 16.39 |

1-Average of 10 specimens

As can be seen, flame retardancy is achieved with the alkali-free sodium antimonate particles of the present invention simultaneously with a yellowness index almost within the range of the control sample containing no antimony flame retardant, which is most surprising in view of the well-known fact that antimony containing flame retardants have a tendency to produce undesirably high yellowness indices.

What is claimed is:

1. In an improved flame-retarding composition for use with synthetic organic polymers, such composition consisting essentially of particulate sodium antimonate and an organic chlorine- or bromine-containing compound equivalent to between 50 and 400% of chlorine or bromine based on the weight of the sodium antimonate, wherein the improvement resides in the presence of said sodium antimonate as particles, substantially all of which are between 0.1 and 8 microns in diameter and at least 40% of which are smaller than 1 micron.

2. The improved flame retarding composition of claim 1 wherein the aqueous phase of a mixture containing water and 10%, based on the weight of said mixture, of said particulate sodium antimonate exhibits a pH of between 6.8 and 7.0.

3. The improved composition of claim 1 wherein the organic chlorine- or bromine-containing compound is selected from the group consisting of chlorinated paraffin waxes and vinyl chloride polymers.

* * * * *